UNITED STATES PATENT OFFICE.

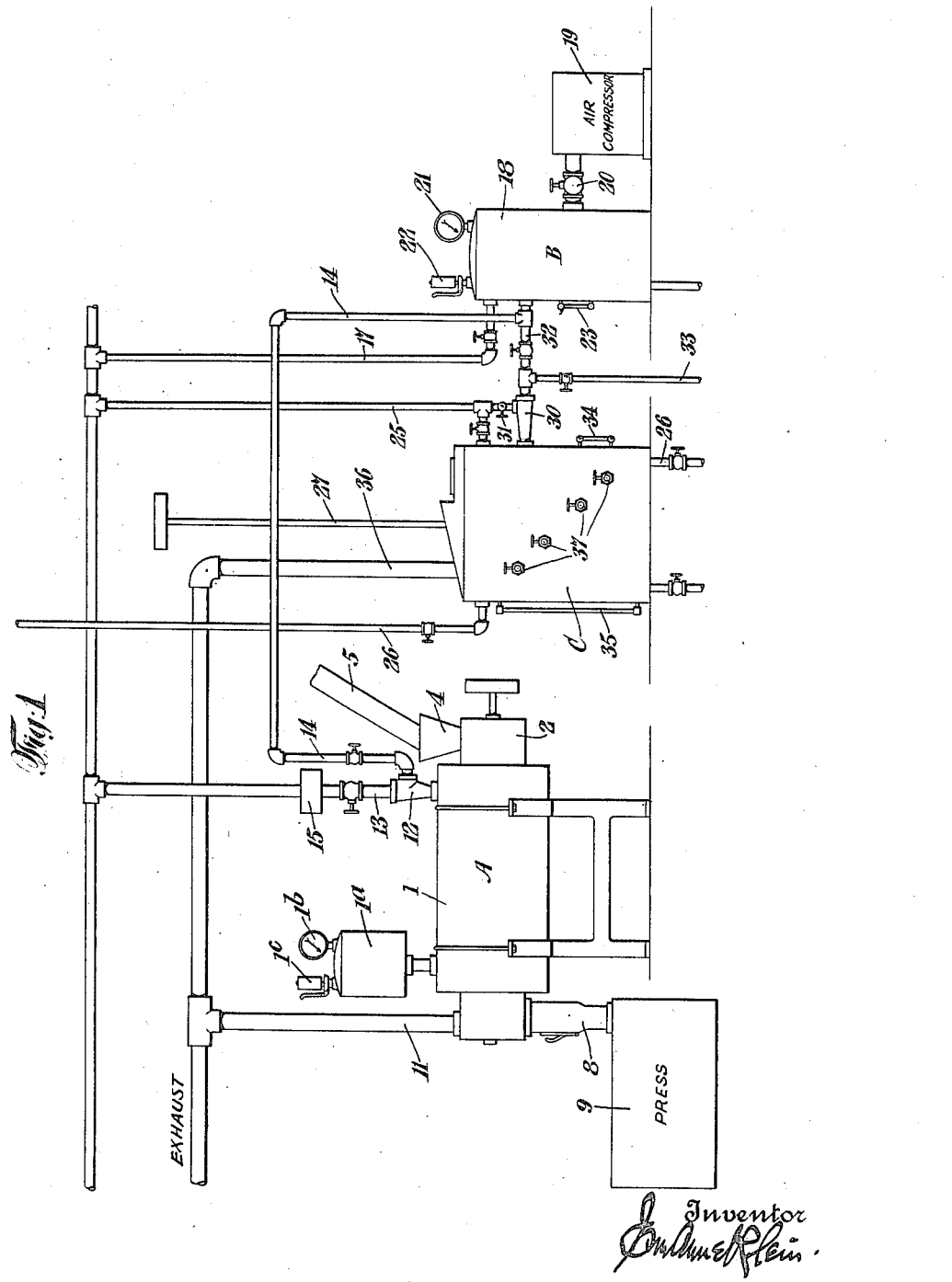

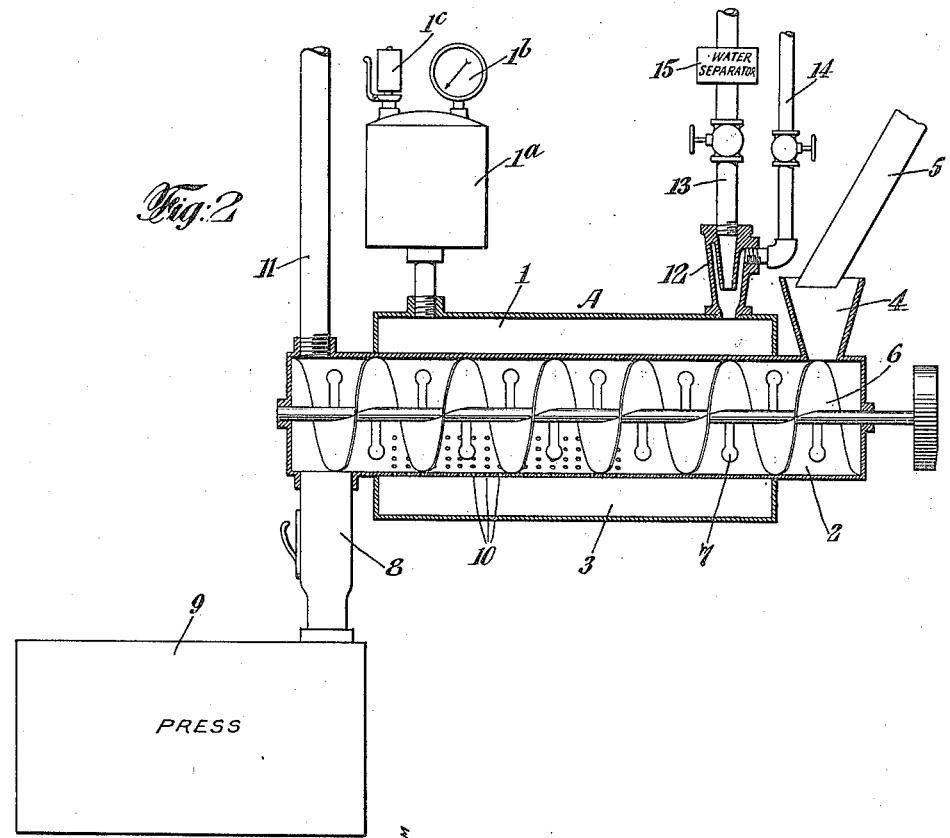
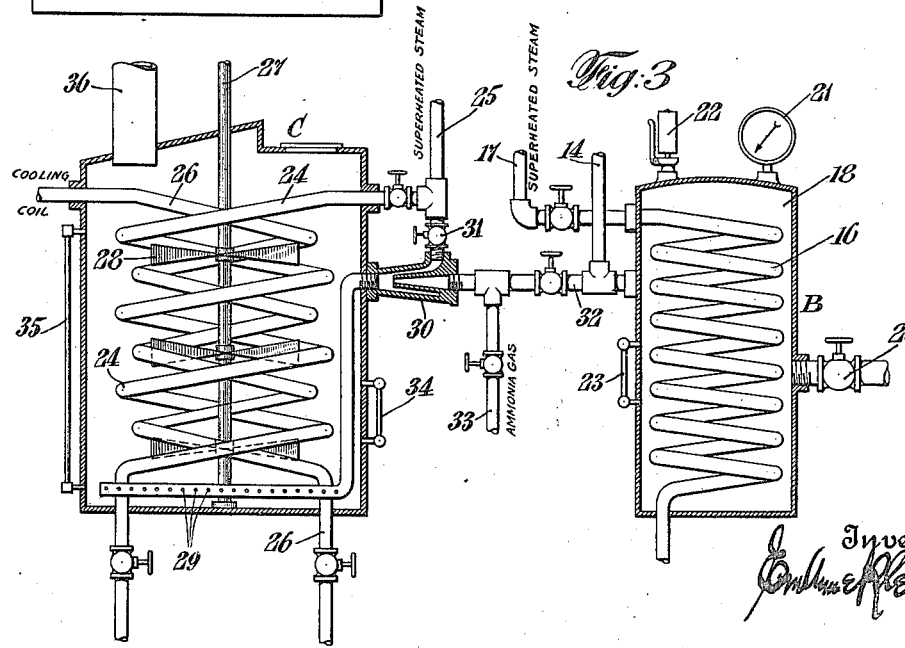

EMANUEL KLEIN, OF NEW YORK, N. Y.

FATTY PRODUCT FROM FIXED OILS AND FATS AND PROCESS OF MANUFACTURING SAME.

1,209,723.

Specification of Letters Patent.

Patented Dec. 26, 1916.

Application filed January 12, 1916. Serial No. 71,637.

*To all whom it may concern:*

Be it known that I, EMANUEL KLEIN, a citizen of the United States, and a resident of the borough of Manhattan, city, county, and State of New York, have invented a new and useful Fatty Product from Fixed Oils and Fats and Processes of Manufacturing Same, of which the following is a specification.

My invention relates to new products manufactured or produced from all those naturally formed substances which consist mostly of glycyl or other esters of the higher members of the several series of fatty (alphatic) acids, with which saturated free fatty acids—hydroxyl acids of the fatty acids series,—lactones and anhydrids of fatty acids and the free alcohols themselves are admixed, and more particularly to new oil products produced from vegetable oil-bearing material, suitable for edible purposes.

My invention also relates to a new process of manufacturing the said new product.

Considered chemically, oils (fatty liquids) and fats (solid fats) are the neutral glycerids of fatty acids. The natural vegetable and animal oils and fats are found in almost all tissues and organs. In plants, oils and fats are deposited in considerable quantities in the seeds, and are associated therein with starch nitrogenous substances, etc., to serve as nourishment to the embryo. When the seed, oil, nuts, etc., are moist, all conditions favorable to the action of enzyms are given and hydrolysis of the oil or fat is produced, with the formation of mono and diglycerids, and of free fatty acids. The free acids so formed are acted upon by the oxygen of the air, so that on pressing such seeds, oils are obtained which not only contain free fatty acids but also leave the presses in a rancid state.

The primary cause of rancidity in the case of unrefined oils and fats, namely, the formation of free fatty acids, is due to the action of moisture in the presence of soluble ferments, which act as catalysts or accelerators. Therefore, those oils and fats are defined as rancid, the free fatty acids of which have been acted upon by oxygen of the air, in the presence of light. Free fatty acids, if present in the crude oils and fats, remain, of course, dissolved in the neutral glycerids. It is, therefore, evident that oils obtained by such simple methods of purification can only be used in those industries where the presence of free fatty acids offers no serious objection, such as in the candle and soap making industries. In other industries exception must be taken to the presence of free fatty acids. The tallow, olive and rape oils containing a high percentage of free fatty acids, are unsuitable as burning oils, or for lubricating purposes. In such cases the free fatty acids must be removed by treatment with alkalis or alkaline earths.

The highest grade of purity is demanded of products intended for edible purposes. In order to attain this object, not only must the raw material (seed, fruit, animal tissues) be carefully selected and worked up in as fresh a state as possible, but the process of rendering must be carried out with special care. In practice it is, of course, impossible to rigidly exclude contact with air during handling, and it is a matter of daily experience, most noticeable in the case of edible oils and fats, that in course of time, sooner or later, according to the conditions observed in keeping, they turn rancid.

In the preparation of oils and fats the enzyms may be considered as having been destroyed, owing to the elevated temperature in the refining operation. Where, however, quantities are prepared merely by rendering at a low temperature, the temperature may not be sufficiently high throughout the whole mass to destroy the enzyms completely, so that there may remain intact a quantity of enzyms sufficient to cause hydrolysis and, subsequently, rancidity. Where the possibility of accelerated hydrolysis due to the presence of enzyms is excluded, a small amount of moisture is sufficient, under favorable conditions (the most important of which is a somewhat high temperature) to cause hydrolysis, and rancidity which follows in its wake. It is, therefore, obvious that it is not only necessary to employ the greatest care in refining, but that it is essential, for the preservation of the refined product, to exclude, as far as possible, the presence of moisture.

The natural vegetable oils and fats are further prepared by comparatively crude methods. Hence they generally contain impurities of one kind or another, such as resinous, chlorophyl, albumin, and mucilaginous matter, remnants of vegetable and animal tissues, substances originally contained in the oil or admixed therewith during treatment and which are not volatilized by steam, and substances which are volatilized by steam, such as aldehydes, terpenes and the like.

By my newly discovered art of producing neutral products intended for edible purposes, the oil-bearing material to be treated may be damaged or moldy.

The main object of the present invention is to eliminate any volatile acids developed in the damaged or moldy oil-bearing material, and to destroy and eliminate the enzyms of fermentation and produce substantially the maximum volume of oil.

Another object of the invention is to produce the above-described results by a process which does not require the use of expensive chemicals.

Another object of the invention is to raise the solidifying point of the edible oil produced.

A further object of the invention is to produce an oil and fat product so constituted chemically as to be practically neutral and free from any taste or odor characteristic of the fatty base, the new product being of a regular and even quality, of a water-white appearance and of lighter specific gravity, and which cannot become rancid.

To enable my invention to be fully understood I will describe the same by reference to the accompanying drawings, in which—

Figure 1 is a diagrammatic view of the apparatus complete; Fig. 2 a longitudinal vertical sectional view of the means for preliminarily heating and volatilizing the oil-bearing material; and Fig. 3 a vertical sectional view of the tank in which the oil is treated, and the air heating means.

According to my invention I make use of a hot air temperer A; of a compressed air heater B, and of a tank C preferably in the form of a cylinder.

The temperer A consists of a horizontal cylindrical tank 1. Extending through this tank is a perforated cylinder 2 of somewhat smaller diameter so that an annular heating space 3 is formed around the same. The cylinder 2 projects beyond the ends of the tank 1, and at one end thereof it is provided with a charging hopper 4 into which empties a chute 5. Within the perforated cylinder is arranged a conveyer 6 which is provided with suitable stirring arms 7. At the discharge end of the cylinder a discharge chute 8 is connected, leading to a press 9. The lower portion of the cylinder 2, near its discharge end, is perforated as shown at 10. This cylinder is also provided with an exhaust pipe 11 at its discharge end, at a point above the discharge chute 8. Connected to the tank 1 is an injector or suction T 12; and to this T is connected a steam pipe 13 and a hot air pipe 14, said pipes being provided with suitable valves. To the steam pipe is connected a water separator 15. The seeds and material to be treated are fed into the cylinder 1 through the chute 5, and are conveyed through said chute and stirred and mixed by means of the conveyer 6. Steam and hot air pass into the heating space 3 through the suction T 12, and heat the cylinder and the contents thereof. A part of this steam and air passes through the perforations 10, thoroughly moistening and heating the mass, the surplus air and steam being exhausted through the pipe 11. The hot and thoroughly mixed mass is passed to the press through the discharge chute 8. The tank 1 is provided with a supplemental tank $1^a$ which is fitted with a pressure gage $1^b$ and a relief valve $1^c$.

The air heater B consists of a tank 18 inclosing a coil 16 to which superheated steam is supplied through pipe 17. The coil 16 is somewhat smaller in diameter than the tank, as shown clearly in Fig. 3. Air is forced, under a high pressure, into the tank 18, by means of an air compressor 19, said compressor being connected to the tank by means of a pipe 20. The tank is provided with a suitable pressure gage 21 and a relief valve 22. A suitable temperature indicator is connected to the side of the tank, as at 23. This air heater is connected to the temperer by means of the pipe 14.

In the tank C is arranged a heating coil 24, said coil being supplied with superheated steam through pipe 25. In this tank is also arranged a cooling coil 26, said coil being arranged within the coil 24, and like said coil, extending throughout substantially the height of said tank. This cooling coil is supplied with cold water, brine or any other cooling medium. Within the tank is also arranged a vertical shaft 27 on which stirrer blades 28 are secured, said stirrer being arranged vertically within the cooling coil. At the bottom of the tank is arranged a perforated pipe 29, said pipe being connected to an injector or suction T 30 arranged in the side of the tank. Connected to this suction T is a pipe 31 through which superheated steam may be supplied; and also connected to said suction T is a pipe 32, through which hot air may be supplied from the air heater B. Connected to the pipe 32 is a pipe 33 by means of which ammonia gas or other suitable cooling agent may be supplied to the suction T 30. These pipes are all provided with valves so that the passage of the various fluids therethrough may be regulated, or shut off entirely when desired. The tank C is provided with a temperature indicator 34, and with a gage 35 by means of which the height of the contents therein may be noted. The tank C is closed at its top, and connected thereto is an exhaust pipe 36. Through this pipe 36 the vapors arising from the material treated in the tank may be drawn off. The tank C is provided with suitable valves 37 through which the material may be discharged.

The heating medium may be any means for securing the desired temperature in the tank, (preferably superheated steam for heating purposes at 150° Cent.) Any suitable cooling means, such as a worm or other suitable device, may be used, and through which may be pumped cold water, brine or calcium chlorid solution, or, if desired, ammonia gas from a refrigerating plant may be used. The purpose of the cooling coil is to prevent a too-high temperature in the fatty mass.

The stirring apparatus may be of any suitable form, and is also for the purpose of preventing a too-high temperature. Hot air is injected into the mass at the bottom thereof, through a perforated pipe, said pipe being connected by the suction T to the air heater. This air heater is in the form of a cylinder containing a steam coil. Air is forced into the heated chamber by an air compressor, and the pressure within said chamber is maintained sufficiently high to force air out through the perforation in the discharge pipe against the pressure of oil in the tank.

In carrying my invention into effect I proceed as follows: The seed, nuts, beans, and oil-bearing material are decorticated, where required. The shells are removed by mechanical means such as a sifter or blower, and the kernels ("meats") are then converted into a pulpy mass or meal by passing them between rollers, or by any other suitable means, until they are reduced to a coarse powder or meal. This meal is then placed in the temperer A. While the meal is passing through the temperer it is subjected to hot compressed air and steam at 150° Cent., whereby the moisture in the tissures is removed and volatilized, and all the volatile matter passes off through the exhaust pipe. The material should be heated above 58° or 60° Cent. The mass of material will be moved sufficiently rapidly to prevent overheating. The hot air and steam kill the enzyms and partly free the meal from volatile matter. From the temperer the meal is delivered to the press by means of which the crude oil is abstracted. The oil-bearing material or the crude oil is then placed in the vessel C in which is placed a substantially equal weight of KOH, NaOH, $Na_2CO_3$ and natural or artificial Seignette salt, containing $KNaC_4H_4O_6 + 4H_2O$ and sea or rock salt water containing NaCl, KCl, $CaCl_2, CaSO_4, MgSO_4, MgCl_2$. The quantity of chemicals will vary with the age or with the quality of the oil-bearing material or crude oil, or by the content of free fatty acid. For example, in a mass of oil-bearing material containing approximately 50% of free fatty acids I would use approximately 23%, measured by weight of the mass, of KOH, NaOH, $Na_2CO_3$, using approximately 8% of each of the said three chemicals to make up the approximate 23% of the weight of the mass with about twenty-three gallons of sea water and about one pound of Seignette. In oil-bearing material containing a less percentage of free fatty acids I would use a less percentage of chemicals, and, of course, where the percentage of free fatty acids was greater than 50% I would use a large percentage of the chemicals. The mass is then thoroughly stirred or otherwise agitated, and subjected to the action of direct superheated steam at 150° Cent., delivered through the suction T 30, and to the hot compressed air which is injected through the perforated pipe from the air heater B through pipe 32, and to the action of the brine which is pumped and permitted to circulate through the coil 26 whereby the steam is partly transformed into $H_2O$. This operation is maintained about two hours. By circulating the cold brine or other cooling means through the cooling coil 26 and ammonia gas from pipe 33 through the suction T 30 and the perforated pipe 29 at the bottom of the tank, said gas passing through the liquid mass, a too-high temperature is prevented, the desired temperature, about 58° Cent. is maintained. The hot compressed air is injected from heater B through the pipe 32 and suction T 30, the pressure being sufficiently high to force the air out through the perforations 29 against the pressure of the oil in the tank, and said air rises in bubbles through the liquid and is discharged as vapor or steam at the surface thereof. By using the direct superheated steam from pipe 25 at 150° Cent. through the suction T, in connection with the hot compressed air from pipe 32 and cold means in coil 26, at one time, the steam will be transformed into $H_2O$, thereby furnishing the solvent for the chemicals, and by this action will decompose the substances containing the disagreeable odor, moldy taste and set free the oil-bearing materials of free fatty acids and other impurities, as stated above. After this operation has continued for about two hours the circulation of the cooling means in coil 26 is discontinued, the agitation by means of the stirrer 28 is stopped, and the pipes 32 and 31 leading to the suction T 30 are closed and the heating suspended. The mixture will then readily separate on standing, as this treatment serves to neutralize and precipitate the free fatty acids and other products of fermentation not previously removed from the oil-bearing material or crude oil, into the two layers. The upper layer consists of the decolorized oil partly freed from impurities; the lower one forms dark to light yellow heavy liquid ("mucilage"), this being a solution of coloring matter in the soap resulting from the union of free fatty acids and chemicals. The upper layer is to be further treated, and is decanted (filtered if required), and placed again in the tank C, in order to subject the fatty mass to the chemical action of ammonia gas from pipe 33 for the purpose of hydrolyzing the glycerids of the higher fatty acids thereby setting free the higher fatty acids; and also subjecting the fatty mass at the same time to a rapid cooling action by means of the cooling medium circulated through the cooling coil 26 for the purpose of separating the higher fatty acids.

The arranged cooling device 26 in which the cold brine or calcium chlorid solution is pumped and permitted to circulate through the fatty liquid mass, in connection with the stirring apparatus 28, will equalize and reduce the temperature at about 3° below to 5° Cent. above zero. During this operation the higher fatty acid is formed and readily separated out as a crystalline mass, or converted into a gelatinous form which withstands all attempts at filtering. By adding mineral or cellulose fiber exemplified by mica, asbestos, cotton woolly hair, cocoanut coir, the inner or red skin which surrounds the peanut, hemp fibers, etc., which may or may not have received a previous treatment with alkali, to the formed higher fatty acid mass when converted into a gelatinous form, the fiber will combine mechanically with the higher fatty acid, and precipitate, thereby raising the solidifying point of the oil. The liquid is then passed through a filter in order to separate it from the solids. After filtration the liquid mass is again placed in the provided tank C, and subjected to the action of indirect steam in coil 24 and agitated by injection of hot compressed air from pipe 32 through suction T 30 and direct superheated steam delivered through the pipe 31 and suction T 30 at about 110° Cent., in connection with the stirring device 28, for about two hours. During this operation the hot compressed air at 110° C. combines with the direct superheated steam, and forms a vapor which passes upwardly through the mass of material in the tank. In its passage through the material this hot vapor vaporizes the moldy substances, coagulates the albumin, destroys the enzyms, vaporizes and combines with the free fatty alcohols, terpenes, aldehydes and other volatile matters detrimental to the oil, and said vapor carrying with it all of these matters, rises from the surface of the liquid and is discharged through the pipe 36. The pressure of the hot air and steam is sufficient to force it through the perforations 29 against the pressure of the oil in the tank, so that the vapor rises through the mass of material in the form of bubbles. Of course, the vapor, as it rises through the mass, will vaporize and combine with the particles of water held in suspension in the mass. This treatment neutralizes and serves to remove any remaining volatile acids and odorous matter not previously removed. Thereafter the oil is mixed and thoroughly agitated in the tank C with the constituents of concha or testa preparata (the boiled, cleaned and powdered shell of the oyster), and with the earthy mineral parts of combustible substances remaining after combustion as the constituents of coal, and with the constituents of orthoclase feldspar and other decolorizing agent for bleaching (excluded mineral acids for edible purposes) in order to subject the mass to the action of the constituents of these materials when hot compressed air through pipe 32 and indirect superheated steam through pipe 24 at 110° C. is applied, during an hour during which time the mass is agitated by the stirrer 28. The entire mass is then permitted to settle and the liquid decanted and filtered. This treatment renders the product an almost odorless, tasteless and always colorless liquid of a fixed nature, and of table oil consistency, so that it will not turn rancid on exposure to oxygen and light in the presence of moisture, and will not, on standing for several weeks, solidify at ordinary temperature to an opaque mass. It solidifies at $-2°$ to $3°$ Cent. It does not distil *in vacuo* without decomposition; its specific gravity at 15° Cent., is 0.901–0.914. It is nearly insoluble in alcohol at ordinary temperature; and dissolves easily in ether; and is insoluble in dilute alcohol.

From the foregoing it is manifest that I produce a new product by destroying and eliminating from the oil-bearing material, the enzyms of fermentation, and eliminating any volatile acids, fatty alcohols, aldehydes and terpenes developed in the moldy or damaged material, by subjecting the crude oil base to mechanical and chemical action in the presence of organic and inorganic substances as set forth herein, whereby the solidifying point is raised and an oil or fat produced, so constituted chemically as to be practically neutral and free from any taste or odor characteristic of the fatty base. The new product is permanently waterwhite and of a regular and even quality, of a lighter specific gravity, which cannot become rancid and does not affect blue litmus paper.

Peanuts (*Arachis hypogœa* L.) containing about 45–50% non-drying, light green to yellow oil of a taste recalling the flavor of kidney beans, specific gravity at 15° Cent.

0.9165–0.920, solidifying point 0° to 3° C. above zero.

Peanut oil produced by my process is odorless, tasteless and permanently water-white, does not, on standing for several weeks, solidify at ordinary temperature, to an opaque mass, solidifies at −1° to −0° Cent. It does not distil *in vacuo* without decomposition; its specific gravity at 15° Cent. is 0.909–0.914. It is sparingly soluble in absolute alcohol, dissolves easily in ether, and is insoluble in dilute alcohol.

My invention is not limited to the precise steps herein set forth for manufacturing products from fat-bearing matter, and the process of treating the oil-bearing base may be modified without departing from the scope of my invention While I have described the use of concha or testa preparata and the earthy and mineral parts remaining after combustion (as coal ashes), and orthoclase feldspar, for use as bleaching and decolorizing agents, I have found that these materials may be used in the first treatment of the crude oil in tank C, substituting them for the NaCO₃. I desire it also understood that these materials may also be used in all the steps in the process.

What I claim is:

1. A fatty product constituting an odorless, permanently water-white, tasteless, constant liquid, non-absorbent as to oxygen and moisture, whereby it is non-rancifiable and will not turn opaque upon standing at ordinary temperatures, insoluble in dilute alcohol, having a specific gravity at 15° Cent. of 0.901–0.914, a solidifying point at −2° to 3° above Cent., decomposing when distilled *in vacuo*, and sparingly soluble in absolute alcohol and readily soluble in ether.

2. A fatty product constituting an odorless, permanently water-white, tasteless, constant liquid solidifying point at −2° to 3° above C., non-absorbent as to oxygen and moisture, whereby it is non-rancifiable and will not turn opaque upon standing at ordinary temperatures, decomposing when distilled *in vacuo*, and sparingly soluble in absolute alcohol and readily soluble in ether and ineffective on blue litmus paper.

3. A fatty product constituting an odorless, permanently water-white, tasteless, constant liquid, non-rancifiable, insoluble in dilute alcohol, having a specific gravity at 15° Cent. of 0.901–0.914, a solidifying point at −2° to 3° above Cent., decomposing when distilled *in vacuo*, and sparingly soluble in absolute alcohol and readily soluble in ether.

4. The process of treating fatty matter consisting in placing the oil-bearing material in a vessel in which is placed KOH, NaOH, Na₂CO₃, and salt, agitating the mass and subjecting it to a heating medium and to hot compressed air and steam delivered directly into the mass at the bottom of the tank, and to the action of a cooling medium to maintain the temperature of the mass at about 58° Cent., continuing this operation for a suitable time and then permitting the mixture to stand and separate into layers, then decanting the upper layer and again placing it in a tank and forming and separating out higher fatty acids in the mass, then adding fiber, then decanting the unsolidified mass, then placing the decanted mass again in a receptacle and subjecting it to indirect steam, and steam injected therein together with hot air at a temperature of about 93° to 110° Cent., and agitating the mass, then subjecting the mass to a decolorizing and bleaching agent together with hot compressed air and a heating medium at a temperature of about 110° Cent., then permitting the mass to settle, and then decanting the liquid after settlement.

5. The process of treating fatty matter consisting in placing the oil-bearing material in a vessel containing KOH, NaOH, Na₂CO₃ and natural or artificial Seignette, sea or rock salt water, agitating the mass and subjecting it to a heating medium and to hot compressed air and steam delivered directly into the mass at the bottom of the tank, and to the action of a cooling medium to maintain the temperature at about 58° Cent., continuing this operation for about two hours and then permitting the mixture to stand and separate into layers, then decanting the upper layer and again placing it in a tank to form and separate out higher fatty acids in the mass, then adding fiber, then decanting the unsolidified mass, then placing the decanted mass again in a receptacle and subjecting it to indirect steam in a coil, and steam injected therein together with hot air at a temperature of about 93° to 110° Cent., and agitating the mass, then subjecting the mass to the action of the constituents of powdered oyster shells and coal ashes, together with hot compressed air and indirect superheated steam and agitation at a temperature of about 110° Cent., then permitting the mass to settle, and then decanting the liquid after settlement.

6. The process of treating fatty matter consisting in placing the oil-bearing material in a vessel in which is placed KOH, NaOH, Na₂CO₃, and dissolved salt, agitating the mass and subjecting it to a heating medium and to hot compressed air and steam delivered directly into the mass at the bottom of the tank, and to the action of a cooling medium to maintain the temperature of the mass at about 58° Cent., continuing this operation for a suitable time and then permitting the mixture to stand and separate into layers, then decanting the upper layer and again placing it in a tank and subjecting it to a cooling medium to form and separate out higher fatty acids in the mass, then precipitating the solidified material, then decanting the mass, then placing the decanted mass in a receptacle and subjecting it to steam injected therein together with hot air, and agitating the mass, then subjecting the mass to the action of the constituents of coal ashes together with hot compressed air and a heating medium and agitation, then permitting the mass to settle, and then decanting the liquid after settlement.

7. The process of treating fatty matter consisting in placing the oil-bearing material in a vessel in which is placed KOH, NaOH, $Na_2CO_3$, and salt solution, agitating the mass and subjecting it to a heating medium and to hot compressed air and steam delivered directly into the mass at the bottom of the tank, and to the action of a cooling medium to maintain the temperature of the mass at about 58° Cent., continuing this operation for a suitable time and then permitting the mixture to stand and separate into layers, then decanting the upper layer and again placing it in a tank and subjecting it to a cooling medium to form and separate out higher fatty acids in the mass, then precipitating the solidified material, then decanting the mass, then placing the decanted mass in a receptacle and subjecting it to steam injected therein together with hot air, and agitating the mass to remove volatile matter, then subjecting the oil to the action of the constituents of powdered oyster shells and coal ashes together with hot compressed air and a heating medium and agitation, then permitting the mass to settle, and then decanting the liquid after settlement.

8. The process of treating fatty matter consisting in placing the oil-bearing material in a vessel containing materials to produce hydrolysis, agitating the mass and subjecting it to an indirect heating medium at a high temperature and to hot compressed air and steam delivered directly into the mass at the bottom thereof, and simultaneously to the action of a cooling medium indirectly applied to maintain the temperature of the mass at about 58° Cent., then permitting the mixture to stand and separate into layers, then decanting the upper layer and again placing it in a tank and subjecting it to ammonia gas and to a cooling medium to form and separate out higher fatty acids in the mass, then adding material to mechanically precipitate the solidified or converted gelatinous mass, then decanting the unsolidified material, then placing the decanted material again in a receptacle and subjecting it to indirect steam, and steam injected therein together with hot compressed air at a temperature of about 90° to 110° Cent., and agitating the mass, then subjecting the mass to a decolorizing and bleaching agent together with hot compressed air and a heating medium and agitation at a temperature of about 110° Cent., then permitting the mass to settle, and then decanting the liquid after settlement.

9. The process of treating fatty matter consisting in placing the oil-bearing material in a vessel containing elements and salt solution to produce hydrolysis, agitating the mass and subjecting it to a heating medium at a high temperature and to hot compressed air and steam delivered directly into the mass at the bottom of the tank, and to the action of a cooling medium to maintain the temperature of the mass at about 58° Cent., completing the hydrolysis by means of ammonia gas and hot air delivered directly into the mass at the bottom thereof to neutralize and precipitate the free fatty acid and other products of fermentation, then permitting the mixture to stand and separate into layers, then decanting the upper layer, forming and separating out higher fatty acids in the decanted liquid, mechanically precipitating the solidified portions of the higher fatty acids and decanting the unsolidified mass, subjecting said decanted mass to a temperature to destroy the enzyms and remove volatile matter, and then decolorizing and bleaching the product.

10. The process of treating fatty matter consisting in placing the oil-bearing material in a vessel containing elements to produce hydrolysis and combined with salt, agitating the mass and subjecting it to a heating medium and to hot compressed air and steam delivered directly into the mass at the bottom thereof, and simultaneously to the action of a cooling medium, then permitting the mixture to stand and separate into layers, then decanting the upper layer, forming and separating out the higher fatty acids in the decanted liquid, mechanically precipitating the solidified portions of the higher fatty acids and then decanting the unsolidified mass, subjecting said decanted mass to a temperature to destroy the enzyms and remove volatile and other detrimental matter, and then subjecting the mass to the bleaching and decolorizing action of powdered oyster shells and the earthy or mineral parts remaining after combustion of coals.

11. The process of treating fatty matter consisting in placing the oil-bearing material in a vessel containing elements and salt water to produce hydrolysis, agitating the mass and subjecting it to a heating medium, and to hot compressed air and direct superheated steam delivered directly into the mass at the bottom thereof, and simultaneously to the action of a cooling medium, then permitting the mixture to stand and separate into layers, then decanting the upper layer, forming and separating out higher fatty acids in the decanted liquid, mechanically precipitating the solidified portions of the formed and separated higher fatty acids and then decanting the unsolidified mass, subjecting said decanted mass to a temperature to destroy the enzyms and remove aldehydes and terpenes and other detrimental matter, and then subjecting the mass to the bleaching and decolorizing action of coal ashes.

12. The process of treating fatty matter consisting in first rendering the mass non-absorbent as to oxygen and moisture, and then mixing the mass with coal ashes, thoroughly agitating the mass and then permitting the mass to settle.

13. The process of treating fatty material consisting in first rendering the fatty material neutral and non-absorbent as to oxygen and moisture, and then mixing the heated fatty matter with concha or testa preparata and with elements remaining after combustion of coal, thoroughly agitating the mass and then permitting the mass to settle.

14. The process of treating fatty matter consisting in subjecting it to the action of the constituents of concha or testa preparata, and coal ashes and then permitting the mass to settle.

15. The process of treating fatty matter consisting in subjecting it to elements remaining after combustion of coal, agitating the mass and then permitting it to settle.

16. The process of treating fatty matter consisting of decolorizing and bleaching it with concha or testa preparata and the earthy and mineral parts remaining after combustion of coal, agitating the mass, and then permitting it to settle.

17. The process of treating fatty matter consisting in rendering the fatty material neutral and non-absorbent and removing volatile matter and subjecting it to the action of elements remaining after combustion of coal and with concha or testa preparata, and then permitting it to settle.

In testimony whereof I hereunto affix my signature.

EMANUEL KLEIN.